United States Patent
Valente (10) Patent No.: US 7,232,397 B2
(45) Date of Patent: Jun. 19, 2007

(54) AXLESHAFT RETENTION ASSEMBLY FOR DIFFERENTIALS AND METHOD OF ASSEMBLY

(75) Inventor: Paul J Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 238 days.

(21) Appl. No.: 11/116,068

(22) Filed: Apr. 27, 2005

(65) Prior Publication Data
US 2006/0247088 A1 Nov. 2, 2006

(51) Int. Cl.
F16H 48/06 (2006.01)

(52) U.S. Cl. ...................... 475/220; 475/249
(58) Field of Classification Search ............... 475/220, 475/248, 252, 249
See application file for complete search history.

(56) References Cited

U.S. PATENT DOCUMENTS

| | | | |
|---|---|---|---|
| 3,400,611 A | 9/1968 | Engle | |
| 3,402,801 A | 9/1968 | Holdeman | |
| 3,624,717 A | 11/1971 | Brubaker | |
| 3,864,992 A | 2/1975 | Lovdahl | |
| 4,365,524 A * | 12/1982 | Dissett et al. | 475/226 |
| 4,495,835 A | 1/1985 | Gleasman | |
| 4,512,211 A * | 4/1985 | Stritzel | 475/227 |
| 4,512,221 A | 4/1985 | Picone | |
| 4,751,853 A * | 6/1988 | Dissett | 475/226 |
| 5,131,894 A | 7/1992 | Hilker | |
| 5,221,238 A * | 6/1993 | Bawks et al. | 475/226 |
| 5,554,081 A | 9/1996 | Bowerman | |
| 5,671,640 A * | 9/1997 | Valente | 74/650 |
| 5,733,216 A | 3/1998 | Bowerman | |
| 5,938,558 A | 8/1999 | Eybergen et al. | |
| 5,957,801 A | 9/1999 | Barnes, II | |
| 5,983,754 A * | 11/1999 | Tyson et al. | 74/650 |
| 5,984,823 A * | 11/1999 | Gage | 475/248 |
| 6,047,615 A * | 4/2000 | Tyson et al. | 74/650 |
| 6,052,074 A | 4/2000 | Iida | |
| 6,053,838 A * | 4/2000 | Gage | 475/248 |
| 6,325,737 B1 * | 12/2001 | Zinke et al. | 475/160 |
| 7,022,041 B2 * | 4/2006 | Valente | 475/252 |
| 7,104,921 B2 | 9/2006 | Shimizu | |
| 7,147,585 B2 * | 12/2006 | Valente | 475/252 |

* cited by examiner

Primary Examiner—Saul Rodriguez
Assistant Examiner—Justin K. Holmes
(74) Attorney, Agent, or Firm—Harness, Dickey & Pierce, P.L.C.

(57) ABSTRACT

A differential assembly includes a differential housing defining a chamber and a pair of aligned openings communicating with the chamber. A pair of output shafts extend through the openings in the differential housing and include end segments located within the chamber. A pair of side gears are positioned within the chamber and fixed to the end segments of the output shaft. Paired sets of pinions are rotatably mounted within the differential housing and placed in meshed engagement with each other and with one of the side gears. A retention assembly interconnects the end segments and includes a spacer having a web positioned between and walls partially encompassing the end segments. The retention assembly includes a ring surrounding the spacer to selectively retain and allow removal of clips engaged with the end segments.

26 Claims, 6 Drawing Sheets

AXLESHAFT RETENTION ASSEMBLY FOR DIFFERENTIALS AND METHOD OF ASSEMBLY

FIELD OF THE INVENTION

The present invention relates to differentials for use in automotive drivelines and, more particularly, to an axle shaft retention assembly for a helical gear differential.

BACKGROUND OF THE INVENTION

Differentials of the type used in automotive drivelines generally include a planetary gearset supported within a differential housing to facilitate relative rotation (i.e., speed differentiation) between a pair of output shafts. In helical gear differentials, the gearset typically includes helical side gears fixed to the end of the output shafts that are meshed with paired sets of helical pinions journalled in gear pockets formed in the differential housing. Since the gear pockets are parallel to the rotary axis of the differential housing, the pinions rotate on axes that are parallel to the common axis of the output shafts and the side gears. In response to speed differentiation between the output shafts, the torque transmitted through meshed engagement of the side gears and pinions generates thrust forces that are exerted by the gear components against the wall surface of the gear pockets and other thrust surfaces within the differential housing to frictionally limit such speed differentiation and proportion torque between the output shafts.

One problem associated with some conventional helical gear differentials is axial separation of the output shafts within the differential housing relative to the side gears. A related problem involves maintaining a proper spacial relationship between the ends of the output shafts. Most typically, C-clip retainers mounted in grooves are utilized for retaining the ends of the output shafts in relation to the side gears. In addition, it is also known to install spacers (i.e., pins, blocks, thrust plates, etc.) in the differential housing between the terminal ends of the output shafts. Due to limited access to the gearset, however, such spacers may be difficult to install within the differential housing. Examples of known spacer and clip arrangements in helical differentials are shown in U.S. Pat. Nos. 4,495,835, 4,512,221, 5,221,238, 5,554,081, 5,671,640 and 5,984,823.

SUMMARY OF THE INVENTION

Thus, it is an object of the present invention to provide a retention assembly for use in a helical differential which is superior to conventional C-clip retention and spacing devices in terms of function and simplified assembly.

The present invention is directed to a differential comprising a housing defining a chamber and a pair of aligned apertures. A pair of output shafts having end segments extending through the aligned apertures in the housing are positioned in the chamber. A gearset is operable to transfer rotary power from the housing to the output shafts while permitting speed differentiation between the output shafts. The gearset is retained in the chamber and includes a pair of side gears drivingly engaged with the end segments of the output shafts. A retention assembly is positioned within the chamber and is operable to maintain the axial position of the end segments of the output shafts. The retention assembly includes a ring having windows, a spacer having recesses and a fastener, the recesses being in receipt of the end segments, the spacer being rotatable within the ring to align the recesses with the windows to allow a pair of clips to pass therethrough and into engagement with the end segments. The fastener is operable to interconnect the ring and the spacer when the recesses are out of alignment with the windows thereby capturing the pair of clips within the recesses of the spacer.

Further areas of applicability of the present invention will become apparent from the detailed description provided hereinafter. It should be understood however that the detailed description and specific examples, while indicating a preferred embodiment of the invention, is intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

With reference to FIGS. 1-8, a shaft retention mechanism for use with a differential assembly 10 will be described. Differential assembly 10 will be described in sufficient detail to describe the structure and function of the shaft retention mechanism. In particular, differential assembly 10 is of the helical parallel-axis type used in motor vehicle driveline applications. However, it is to be understood that the shaft retention mechanism of the present invention is applicable for use with many variants of differential assembly 10 and, as such, the particular structure shown is intended merely to be exemplary in nature.

Differential assembly 10 includes a housing assembly 12 which defines an internal chamber 14. Housing assembly 12 includes a main drum 16 and an end cap 18 which is secured to a radial flange 20 of drum 16 by a plurality of bolts (not shown) installed through aligned mounting bores 22. As is known, a ring or bevel gear can be fixed to radial flange 20 on housing assembly 12 to transfer rotary power (i.e., drive torque) thereto. Housing assembly 12 defines a pair of axially aligned openings 24 and 26 in communication with chamber 14 and which are adapted to receive and rotatably support the end segments of a pair of output shafts, hereinafter referred to as axle shafts 28a and 28b. The end segment of axle shafts 28a, 28b includes a corresponding recessed annular groove 30a, 30b which separates a button-like end pad 32a, 32b from an externally-splined segment 34a, 34b. End pads 32a, 32b have a corresponding circular peripheral surface 36a, 36b, an outer face surface 38a, 38b, and an inner face surface 40a, 40b. The outer diameter of end pads 32a, 32b is shown to be slightly smaller than the outer diameter of splined segment 34a, 34b on shafts 28a, 28b. As will be detailed, a retention assembly 42 is installed between end pads 32a, 32b to maintain the axial spacing between shafts 28a and 28b and prevent axial separation thereof.

Differential assembly 10 includes a planetary gearset which is operable for transferring drive torque from housing assembly 12 to axle shafts 28a, 28b in a manner facilitating speed differential therebetween. The helical gearset is mounted in chamber 14 and includes a pair of side gears 44a, 44b having internal splines 46a, 46b meshed with externally splined segments 34a, 34b on a corresponding one of the axle shafts 28a, 28b. In addition, side gears 44a, 44b include axial hubs 45a, 45b which are retained in corresponding annular sockets 47a, 47b formed in drum 16 and end cap 18 of housing assembly 12. C-shaped retainers, or C-clips 48a, 48b, are retained in aligned grooves 30a, 30b for restraining the axle shafts from moving outboard.

The helical gearset also includes a series of first pinions 50 journally supported in pockets 52 formed in raised hub segments 54 of drum 16, and a series of second pinions 56 journally supported in pockets 58 also formed in hub segments 54 of drum 16. Pockets 52 and 58 are formed in paired sets such that they communicate with each other and with chamber 14. In addition, pockets 52 and 58 are aligned to be substantially parallel to the rotational axis of shafts 28a, 28b. When assembled, first pinions 50 mesh with side gear 44a while second pinions 56 mesh with side gear 44b. Additionally, the paired sets are arranged such that one of first pinions 50 also meshes with one of second pinions 56. Windows 60 are formed in drum 16 between hub segments 54 and are provided for permitting access to the gearset within chamber 14.

Figure 1:
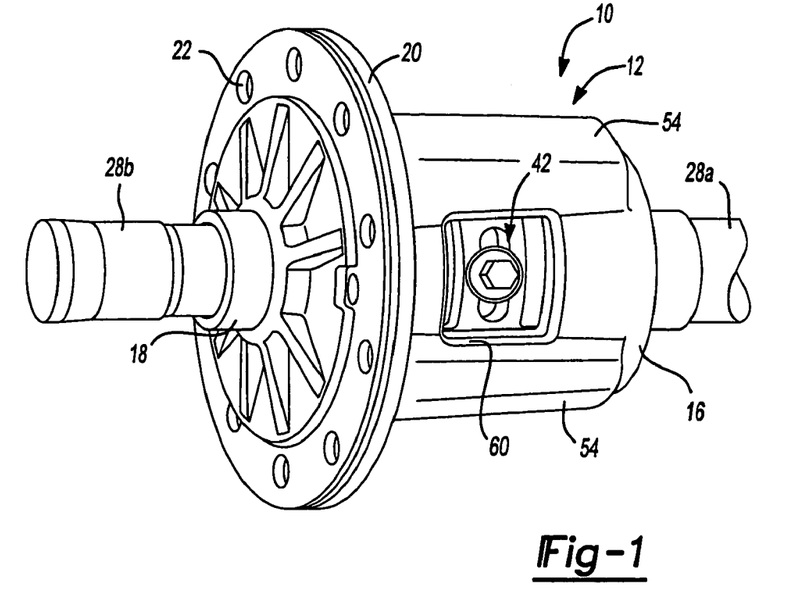
FIG. 1 is a perspective view of a differential assembly equipped with the retention assembly of the present invention.
Figure 2:
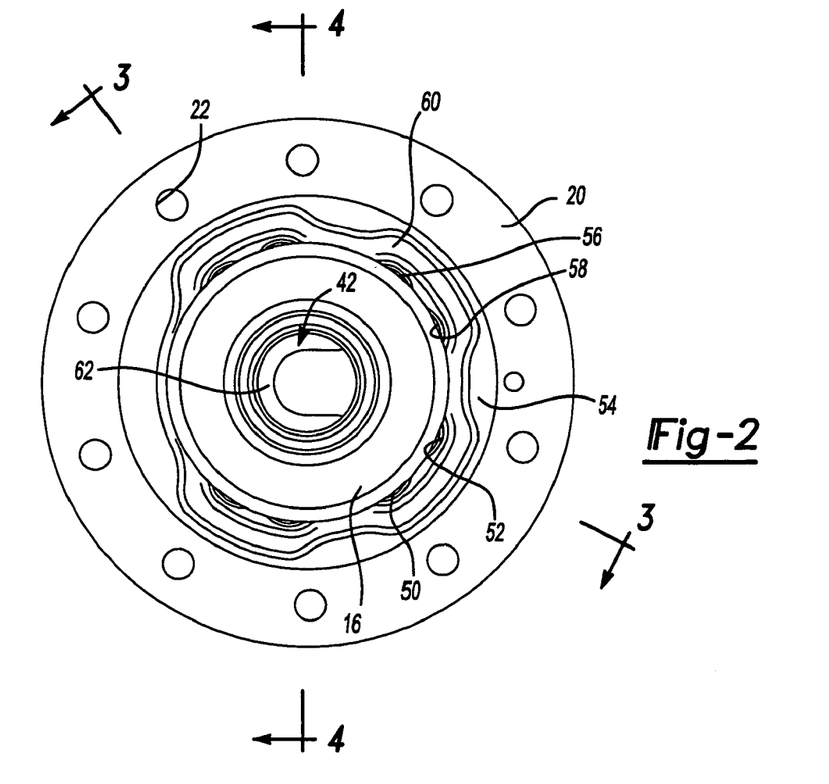
FIG. 2 is an end view of the differential assembly shown in FIG. 1.
Figure 3:
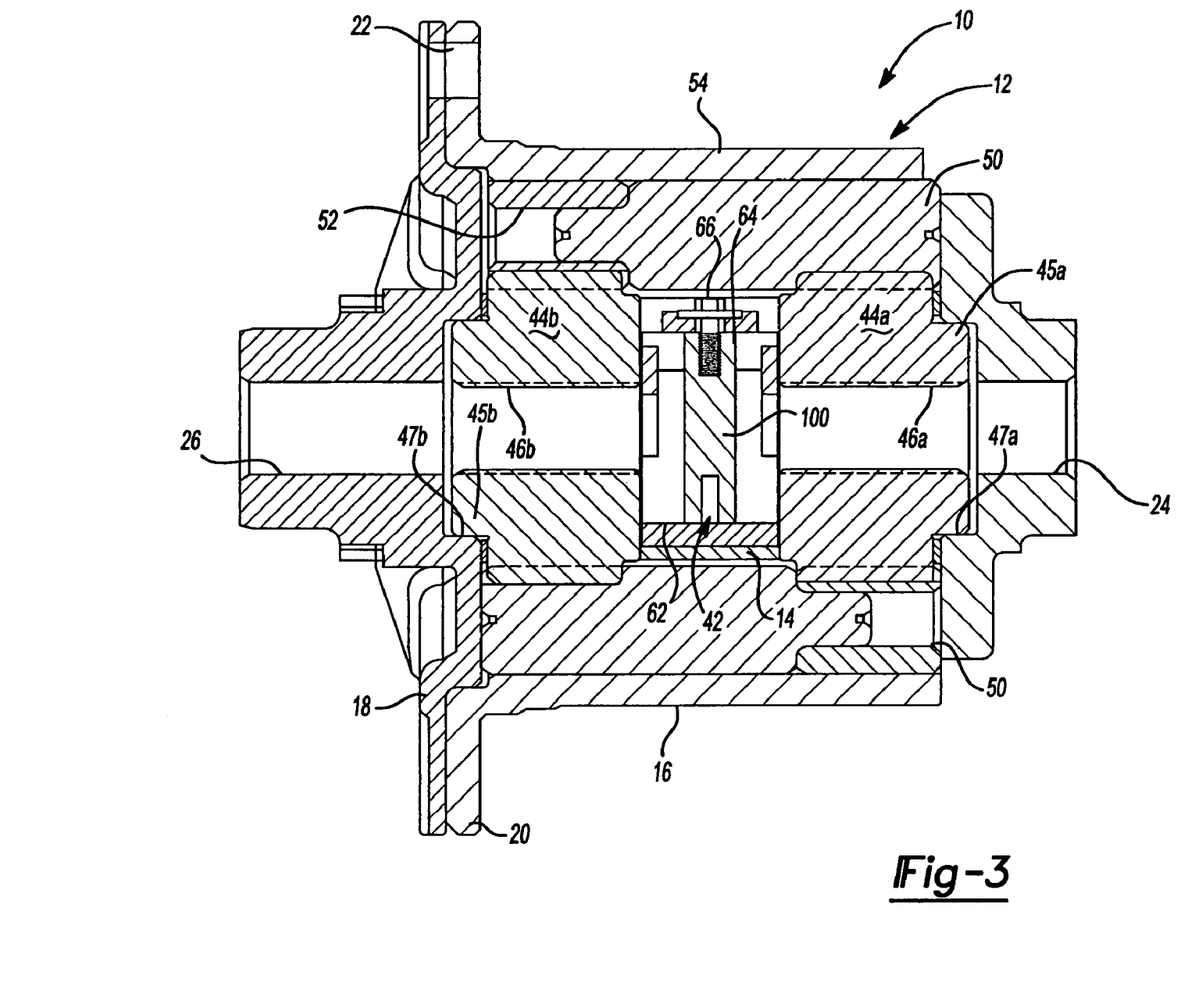
FIG. 3 is a sectional view taken generally along line 3-3 of FIG. 2 with the axle shafts removed.
Figure 4:
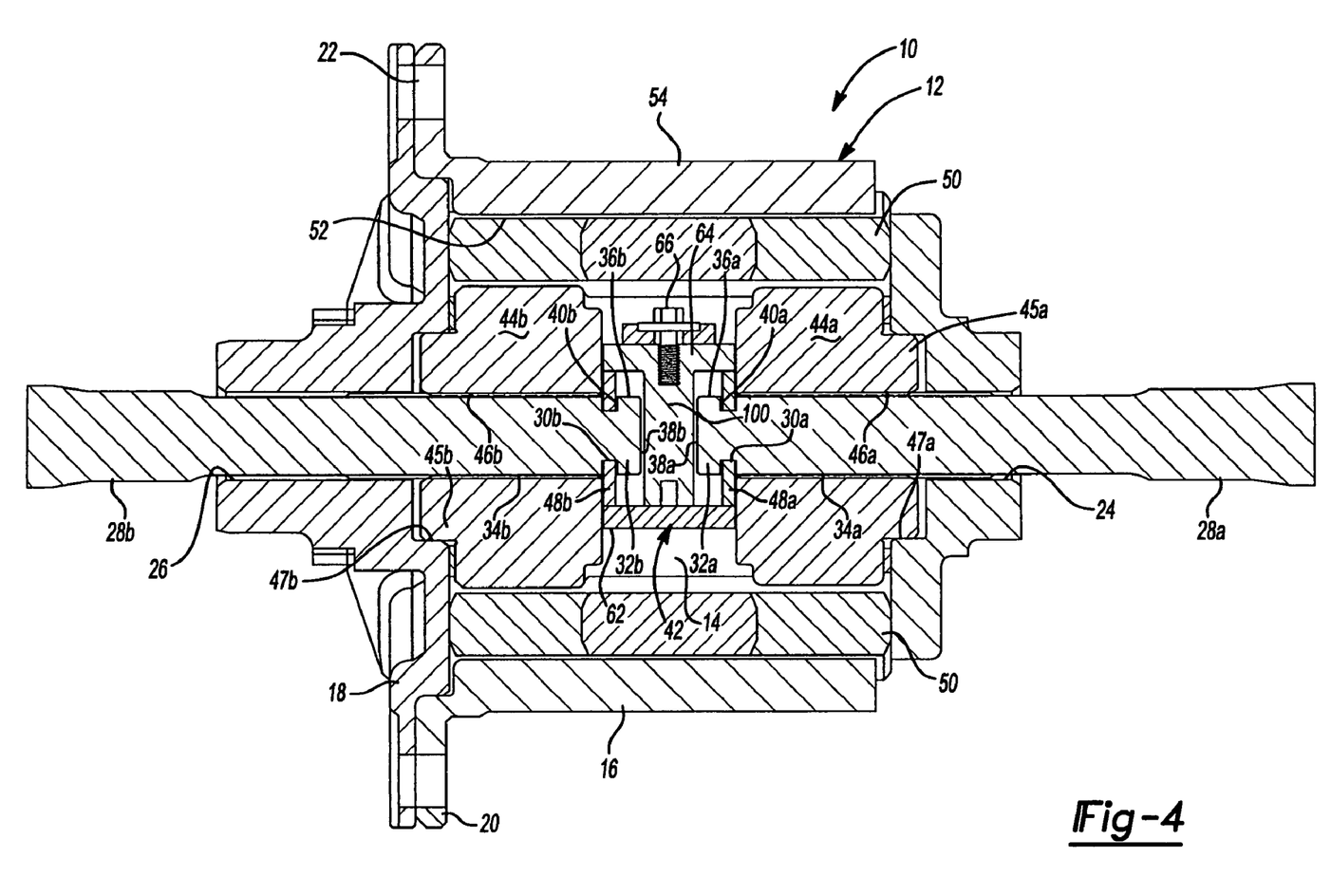
FIG. 4 is a sectional view taken generally along line 4-4 of FIG. 2.
Figure 5:
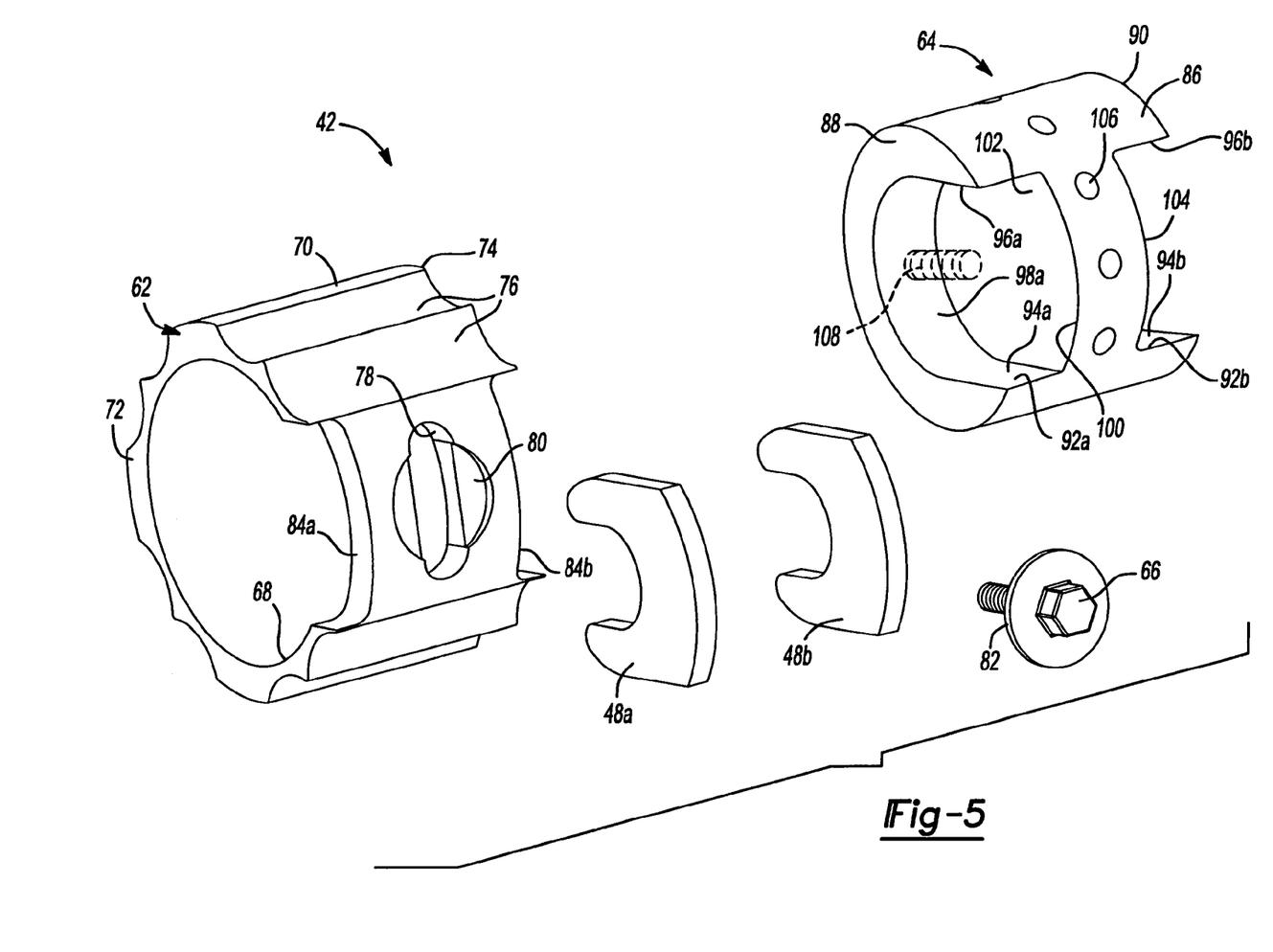
FIG. 5 is an exploded perspective view of the retention assembly of the present invention.

In accordance with the present invention, retention assembly 42 is provided for maintaining side gears 44a, 44b and axle shafts 28a, 28b in axially spaced relation relative to each other while preventing unintentional release of C-clips 48a, 48b from grooves 30a, 30b. Retention assembly 42 includes a ring 62, a spacer 64, C-clips 48a, 48b and a fastener 66. As best shown in FIG. 5, ring 62 is substantially cylindrically shaped having an inner cylindrical surface 68 and an outer cylindrical surface 70 extending from a first end face 72 to a second end face 74. Outer cylindrical surface 70 is interrupted by a plurality of scallops 76. Scallops 76 function to prevent ring 62 from rotating within housing assembly 12. An elongated slot 78 radially extends through ring 62 to provide an access aperture for fastener 66 as will be described in greater detail hereinafter. A counterbore 80 is formed in one portion of outer cylindrical surface 70 in communication with elongated slot 78 to provide a seat for a washer 82 used in conjunction with fastener 66. A pair of windows 84a and 84b are formed within ring 62 to provide access for C-clips 48a and 48b. Window 84a extends from inner cylindrical surface 68 to outer cylindrical surface 70 for an arc length long enough to clear the height of C-clip 48a. Window 84b is similarly sized, shaped and positioned as a feature removed from second end face 74.

Spacer 64 is a substantially cylindrical member having an outer surface 86 extending from a first end face 88 to a second end face 90. Spacer 64 includes first and second recesses 92a and 92b sized and shaped for receipt of the end segments of axle shafts 28a, 28b as well as C-clips 48a, 48b. Recess 92a is substantially "C" shaped having a substantially planar first land 94a spaced apart from a substantially planar second land 96a. An arc-shaped portion 98a interconnects first land 94a and second land 96a. Recess 92b is similarly sized and shaped to include a first land 94b and a second land 96b interconnected by an arc-shaped portion 98b (not shown). A web 100 separates recess 92a and recess 92b. Web 100 includes a substantially planar first surface 102 positioned substantially parallel to and spaced apart from a second substantially planar surface 104. A plurality of apertures 106 radially inwardly extend into spacer 64 from outer surface 86. Apertures 106 are circumferentially spaced apart from one another and positioned along a plane midway between first end face 88 and second end face 90. Apertures 106 provide an installer of retention assembly 42 a method to rotate spacer 64 while spacer 64 is positioned within ring 62. A pin or other lever arm (not shown) is inserted through elongated slot 78 of ring 62 and into one of apertures 106 to apply a torque to spacer 64 and rotate the spacer relative to ring 62. Spacer 64 includes a threaded aperture 108 radially inwardly extending from outer surface 86 along an axis aligned with recesses 92a and 92b. Threaded aperture 108 enters from the side of spacer 64 where the open ends of recesses 92a, 92b are not present.

Figure 6:
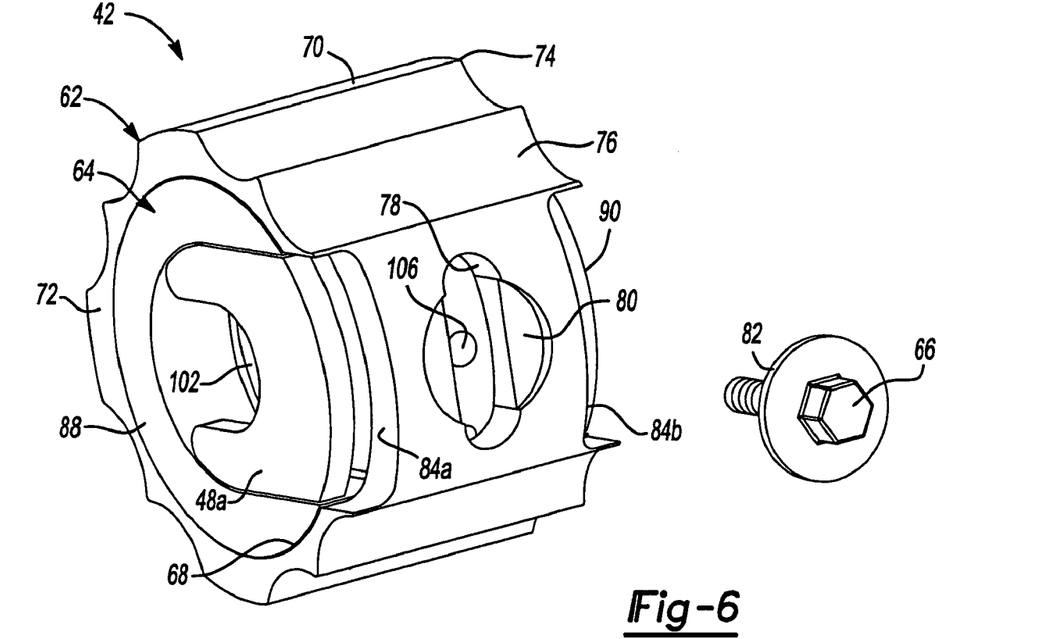
FIG. 6 is a perspective view of the retention assembly at a first assembly stage.
Figure 7:
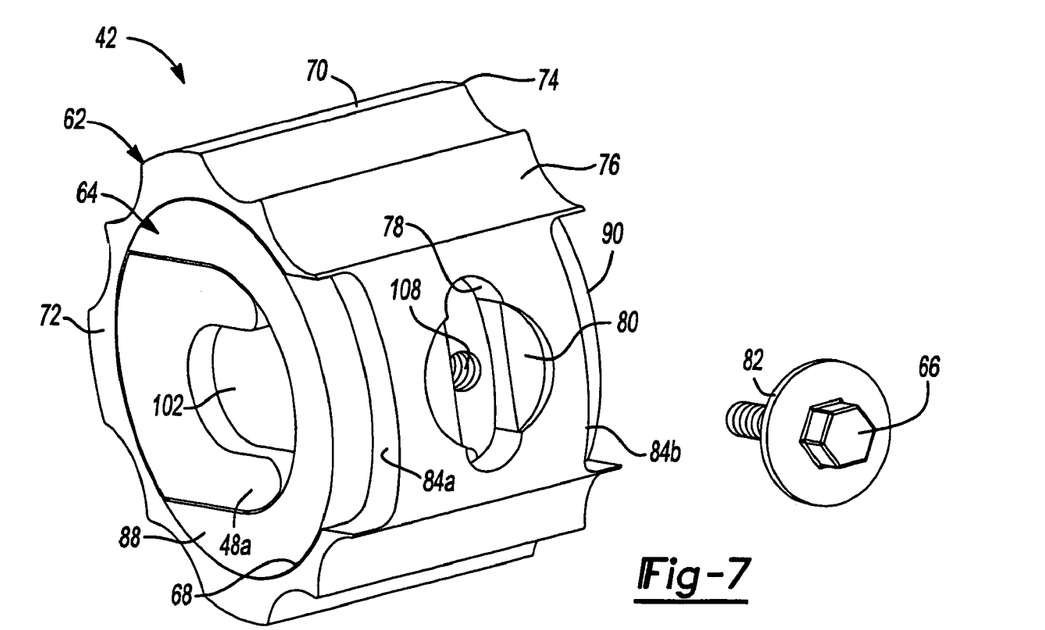
FIG. 7 is a perspective view of the retention assembly at a second assembly stage.
Figure 8:
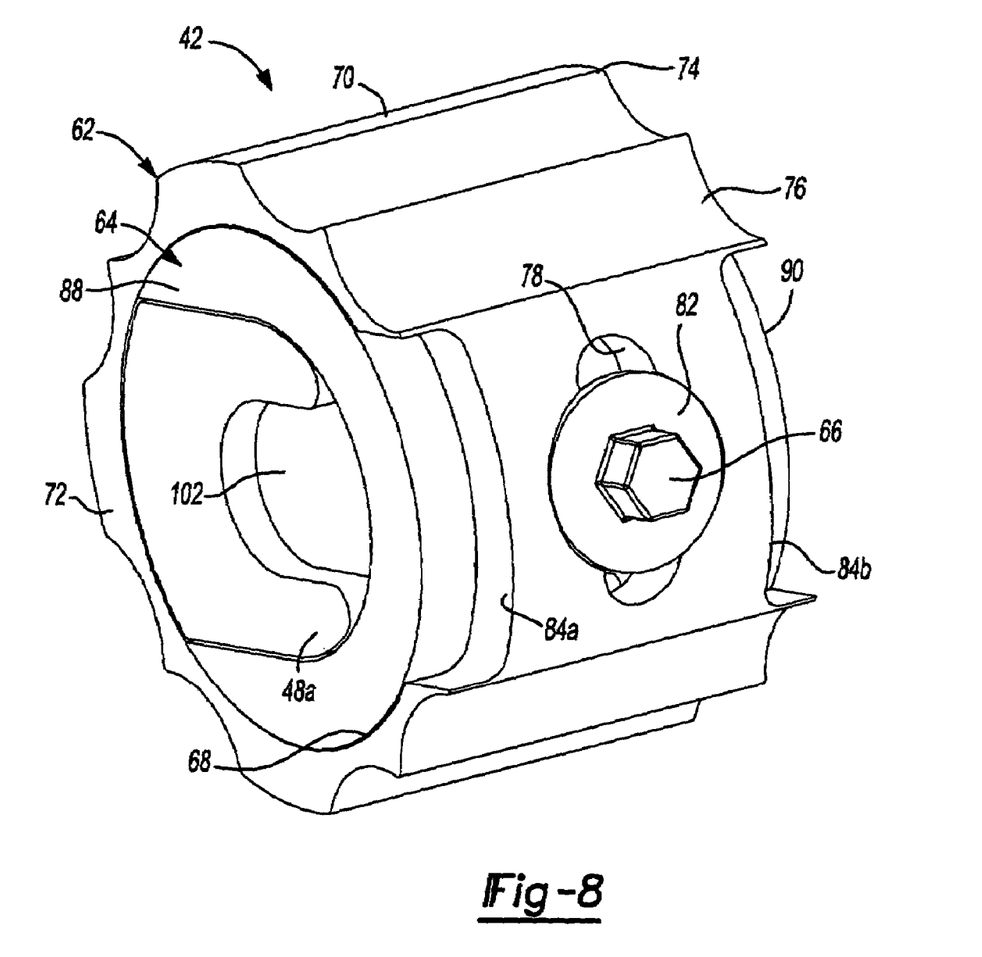
FIG. 8 a perspective view of the retention assembly at a final assembly stage.

FIGS. 6-8 depict the order of operations performed to retain axle shafts 28a and 28b to the differential assembly 10 using retention assembly 42. It should be appreciated that ring 62 and spacer 64 are axially installed within chamber 14 during an initial build phase of differential assembly 10. The differential assembly 10 is then rotatably mounted within a transaxle or rear axle carrier. Ring 62 and spacer 64 remain captive within chamber 14 and are not removed from the differential assembly while the differential assembly is captured within a carrier housing (not shown).

To retain axle shafts 28a and 28b to differential assembly 10, each axle shaft is inserted within its respective housing assembly opening 24, 26 and into chamber 14. Axle shafts 28a and 28b are translated until outer face surfaces 38a and 38b contact first surface 102 and second surface 104 of web 100. At this time, recesses 92a and 92b of spacer 64 must be aligned with windows 84a and 84b of ring 62. If this condition does not presently exist, the installer inserts a rod through elongated slot 78 into one of apertures 106 formed within spacer 64 to rotate spacer 64 and align recesses 92a, 92b with windows 84a, 84b. Once the recesses and windows have been aligned, C-clip 48a is translated through window 84a and recess 92a into groove 30a of axle shaft 28a. Similarly, C-clip 48b is translated through window 84b and into recess 92b while entering groove 30b of axle shaft 28b. At this time, axle shafts 28a and 28b are restrained from movement along their rotational axes by web 100 and the end faces of side gears 44a, 44b.

To maintain the proper position of C-clips 48a and 48b, spacer 64 is rotated approximately 180 degrees to capture the C-clips within ring 62. As previously described, spacer 64 may be rotated relative to ring 62 through use of a pin and apertures 106. Once spacer 64 is properly positioned relative to ring 62, threaded aperture 108 will be aligned with elongated slot 78 and counterbore 80. At this time, the user threadably engages fastener 66 with threaded aperture 108 to restrict spacer 64 from rotating relative to ring 62. The assembly process may be reversed to allow removal of axle shafts 28a, 28b from differential assembly 10.

Furthermore, the foregoing discussion discloses and describes merely exemplary embodiments of the present invention. One skilled in the art will readily recognize from such discussion, and from the accompanying drawings and claims, that various changes, modifications and variations

What is claimed is:

1. A differential comprising:
   a housing defining a chamber and a pair of aligned apertures;
   a pair of output shafts having end segments extending through said aligned apertures in said housing and positioned in said chamber;
   a gearset operable to transfer rotary power from said housing to said output shafts while permitting speed differentiation between said output shafts, said gearset being retained in said chamber and including a pair of side gears drivingly engaged with said end segments of said output shafts; and
   a retention assembly positioned within said chamber and operable to maintain the axial position of said end segments of said output shafts, said retention assembly including a ring having windows, a spacer having recesses and a fastener, said recesses being in receipt of said end segments, said spacer being rotatable within said ring to align said recesses with said windows to allow a pair of clips to pass therethrough and into engagement with said end segments, said fastener being operable to interconnect said ring and said spacer when said recesses are out of alignment with said windows thereby capturing said pair of clips within said recesses of said spacer.

2. The differential of claim 1 wherein said spacer includes a plurality of circumferentially spaced apart apertures adapted to temporarily accept a tool for rotating said spacer relative to the said ring.

3. The differential of claim 1 wherein said windows are open-ended depressions formed on end faces of said ring.

4. The differential of claim 1 wherein said recesses include first and second substantially planar, parallel walls interconnected by an end wall.

5. The differential of claim 1 wherein said output shafts are separable from said gearset without removing said ring or said spacer from said housing.

6. The differential of claim 1 wherein said spacer includes a web positioned between said end segments.

7. The differential of claim 6 wherein said clips are axially captured between said web and said side gears.

8. The differential of claim 7 wherein each of said clips includes a curved end shaped to complement an inner surface of said ring.

9. A differential assembly for supplying driving torque from a drive shaft to a pair of output shafts, comprising:
   a differential housing adapted to be rotatably driven by the drive shaft, said housing defining a chamber having shaft openings at opposite ends thereof;
   a pair of side gears disposed in said chamber, said side gears being non-rotatably mounted to end segments of the output shafts which extend through said shaft openings;
   a pair of meshed differential pinions rotatably mounted within gear pockets formed in said differential housing, said pinions having a longitudinal axis parallel to the axis of said side gears with each pinion meshed with one of said side gears; and
   a retention assembly including a spacer rotatably positioned within a ring, said spacer including recesses in receipt of said end segments, said spacer being rotatable between a first position where said recesses are aligned with slots extending through said ring and a second position where said recesses are out of alignment with said slots, wherein clips are allowed to pass through said slots, enter said recesses and engage the end segments when said spacer is in said first position, and wherein said clips are captured within said ring when said spacer is in said second position.

10. The differential assembly of claim 9 further including a fastener interconnecting said ring and said spacer to resist relative rotation between said ring and said spacer.

11. The differential assembly of claim 9 wherein said spacer includes a web positioned between the end segments to limit axial movement of the output shafts.

12. The differential assembly of claim 9 wherein said spacer limits the allowable axial travel of each of said side gears.

13. The differential assembly of claim 9 wherein a side load acting on said side gears is reacted by said spacer and not transferred through said clips.

14. The differential assembly of claim 9 wherein the output shafts are separable from said differential assembly without removing said ring or said spacer from said differential housing.

15. The differential assembly of claim 14 wherein said spacer is sized and shaped such that it may not be removed from said differential housing without first removing the output shafts from said chamber.

16. A differential assembly comprising:
   a differential housing defining a chamber and a pair of aligned openings communicating with said chamber;
   a pair of output shafts extending through said openings in said differential housing and having end segments located within said chamber;
   a pair of side gears disposed in said chamber and fixed to said end segments of said output shafts;
   paired sets of pinions rotatably mounted within said differential housing and in meshed engagement with each other and with one of said side gears; and
   a retention assembly interconnecting said end segments, said retention assembly including a spacer having a web positioned between and walls partially encompassing said end segments, said retention assembly also including a ring surrounding said spacer to selectively retain and allow removal of clips engaged with said end segments, wherein said spacer limits the allowable axial travel of each of said side gears, and wherein said ring and said spacer each include an aperture selectively alignable with the other to define a passage sized to allow one of said clips to pass therethrough, said spacer being rotatable relative to said ring to selectively misalign said apertures and capture said clip within said ring.

17. The differential assembly of claim 16 further including a fastener interconnecting said ring and said spacer to resist relative rotation therebetween.

18. The differential assembly of claim 17 wherein said ring and said spacer remain within said housing during installation and removal of said output shafts.

19. A differential assembly comprising:
   a housing defining a chamber and a pair of aligned apertures;
   a pair of output shafts having end segments extending through said apertures into said chamber;
   a gearset operable to transfer drive torque from said housing to said output shafts while permitting speed differentiation therebetween, said gearset disposed within said chamber and including a pair of side gears fixed for rotation with said end segments of said output shafts;

a retention assembly positioned within said chamber between said side gears and operable to axially position said end segments of said output shafts, said retention assembly including a ring disposed between said side gears and a spacer rotatably positioned within said ring and having recesses within which said end segments are disposed, said spacer is rotatably between a first position where said recesses align with apertures extending through said ring and a second position where said recesses are out of alignment with said apertures; and a pair of clips, said clips are permitted to pass through said apertures in said ring and engage said end segments within said recesses in said spacer when said spacer is located in its first position, and wherein said clips are captured within said recesses when said spacer is rotated to its second position.

20. The differential assembly of claim 19 wherein said retention assembly further includes a fastener operable to connect said spacer to said ring when said spacer is located in its second position.

21. The differential assembly of claim 19 wherein said spacer includes a web segment between its recesses which extends between said end segments of said output shafts.

22. The differential assembly of claim 19 wherein said clips are sized to engage grooves formed in said end segments of said output shafts so as to be located in said recesses of said spacer adjacent to said side gears.

23. The differential assembly of claim 19 wherein said ring includes a slot aligned with a first hole formed in said spacer so as to define said first position and a second hole formed in said spacer so as to define said second position, said retention assembly further including a fastener adapted to pass through said slot for retention in said second hole.

24. A differential assembly comprising:
a housing defining a chamber and first and second aligned apertures;
a first shaft having a first end segment extending through said first aperture into said chamber;
a second shaft having a second end segment extending through said second aperture into said chamber;
a gearset disposed in said chamber and including a first side gear fixed for rotation with said first end segment of said first shaft, a second side gear fixed for rotation with said second end segment of said second shaft, and pinion gears meshed with said first and second side gears for transferring drive power from said housing to said first and second shafts while permitting speed differentiation therebetween;
a ring disposed between said first and second side gears and defining a cavity with first and second windows communicating with said cavity;
a spacer rotatably supported within said cavity and having a first recess alignable with said first window, a second recess alignable with said second window, and a web segment disposed between said first and second recesses, said first end segment of said first shaft is positioned within said first recess and said second end segment of said second shaft is positioned with said second recess;
a first retainer clip passing through said first window in said ring to engage said first end segment within said first recesses in said spacer when said spacer is rotated to a first position;
a second retainer clip passing through said second window in said ring to engage said second end segment within said second recesses in said spacer when said spacer is rotated to its first position; and
a fastener for securing said spacer to said ring when said spacer is rotated to a second position for retaining said first and second clips within said first and second recesses.

25. The differential assembly of claim 24 wherein web segment includes a first hole alignable with a slot through said ring to permit a tool to position said spacer in its first position relative to said ring such that said first and second recesses are aligned with said first and second windows to accept installation of said first and second retainer clips therein.

26. The differential assembly of claim 25 wherein said ring includes a second hole alignable with said slot through said ring to permit said tool to position said spacer in its second position relative to said ring such that said first and second recesses are misaligned relative to said first and second windows to prevent removal of said first and second retainer clips therefrom; and wherein said fastener is adapted to extend through said slot in said ring into said second hole in said spacer.

* * * * *